United States Patent [19]

Hanneman

[11] Patent Number: 5,197,536
[45] Date of Patent: Mar. 30, 1993

[54] POLYMER LAMINATED DRAG CAST CAN STOCK AND METHOD

[75] Inventor: Rodney E. Hanneman, Midlothian, Va.

[73] Assignee: Reynolds Metals Company, Richmond, Va.

[21] Appl. No.: 699,415

[22] Filed: May 13, 1991

[51] Int. Cl.$^5$ .............................................. B22D 11/06
[52] U.S. Cl. ...................................... 164/476; 164/479
[58] Field of Search ............... 164/479, 429, 476, 461, 164/463, 423

[56] References Cited

U.S. PATENT DOCUMENTS 4,326,579  4/1982  Pond, Sr. et al. .................. 164/461

Primary Examiner—Richard K. Seidel
Assistant Examiner—Erik R. Puknys
Attorney, Agent, or Firm—Alan M. Biddison

[57] ABSTRACT

A method for making a polymer laminated drag cast aluminum alloy container stock material includes, in a preferred embodiment, drag casting an aluminum alloy suitable for forming into beverage containers into a sheet. The sheet is then cold rolled, at least one of the sheet's surfaces is cleaned and pretreated and a polymer material is laminated thereto. The polymer laminate on the drag cast aluminum alloy surface permits the use of drag cast aluminum alloy sheet material to be utilized, for example, as aluminum beverage container stock material.

17 Claims, 3 Drawing Sheets

POLYMER LAMINATED DRAG CAST CAN STOCK AND METHOD

FIELD OF THE INVENTION

This invention relates to a method of making a polymer laminated drag cast aluminum alloy sheet material which is suitable for subsequent drawing operations into aluminum beverage containers as well as the novel products produced thereby.

BACKGROUND ART

In the prior art, high speed, optimal manufacture of drawn and ironed aluminum beverage cans has been highly developed in conjunction with the optimal properties and microstructure of the input can stock. It has been observed that an optimal distribution of Fe Mn $Al_x$ precipitated phase in Aluminum Association (AA) registered aluminum alloys 3104 and 3004 is important in polishing the dies of the can making equipment in order to prevent excessive generation of fines, galling and wear. In order to achieve these desired metallurgical properties, these types of aluminum alloys have been produced by conventional casting techniques followed by rolling and heat treatment cycles prior to the can making operation.

As an alternative to producing aluminum alloys by conventional casting techniques, a direct casting method has been developed wherein molten aluminum is cast in the form of a metal strip and formed into a coil on a coiler. Generally, in this process molten aluminum is deposited on a moving chill surface from a tundish having an open outlet. An inlet is provided for the flow of molten metal into the tundish from a source of molten metal. The direct casting of the molten aluminum metal onto a chill wheel, preferably a grooved chill wheel, produces a cast aluminum product at a rapid rate. The aluminum cast strip is wound on the coiler in heated form. Drag casting apparatus and methods of this type are described, for example, in U.S. Pat. Nos. 4,828,012, 4,751,957, 4,896,715, and 4,934,443 and in PCT publications WO89/09667, published Oct. 10, 1989, and WO90/05604, published May 3, 1990. The disclosures of these patents and PCT publications are hereby specifically incorporated by reference with respect to the methods for the production of aluminum strip and coil formed from molten aluminum or aluminum alloys.

The drag casting process as described above produces a cast product that includes drawbacks preventing its application in deep drawing operations which are generally employed in beverage container making. Due to the rapid cooling of the cast product, the grain structure necessary for efficient drawing operations cannot be obtained. Specifically, intermetallic compounds such as Fe Mn $Al_x$ are not sufficiently large enough or distributed properly within the microstructure to ensure the proper die polishing during the drawing steps. In addition, the top surface of the drag cast product generally has higher levels of porosity than products made using conventional casting techniques and the bottom surfaces of drag cast products include grooves therein as a result of the casting drum texture. Additionally, drag cast products exhibit lower levels of strength, tensile elongation, and ductility than conventionally produced beverage container stock material. Other problems associated with these direct cast products include difficulties in maintaining gauges within tolerances and proper sheet shape or profile.

Given the process' advantages and economic benefits of forming aluminum alloys using direct drag casting techniques rather than conventional casting and the vast tonnages of aluminum alloy beverage container stock material produced, a need has developed to produce aluminum alloy beverage container stock material by methods having reduced unit costs.

In response to this need, it has been discovered that aluminum alloy beverage container stock material may be produced by drag casting techniques when the drag cast product is coated with a polymeric material prior to subsequent drawing processes. The polymeric coating overcomes problems associated with the use of drag cast aluminum alloy material for aluminum beverage container stock material. The polymeric coating separates the aluminum alloy from the drawing tools such that the metallurgical structure of the drag cast product is less important to ensure product quality. Furthermore, the polymeric coating provides a lubricating media which minimizes the criticality of the aluminum alloy sheet gauge and flatness and ameliorates issues of ductility.

In the prior art, the use of organic coatings for aluminum beverage containers is known. The method of applying known organic coatings such as polyethylenes, polypropylenes or polyolefins includes cleaning and pretreating the aluminum sheet and subsequently coating the aluminum sheet in continuous operations. The organic coatings may be applied on one or both sides with one or two coats per side. In a two coat system, the first coat may be designed for good adhesion to the aluminum alloy sheet while a second coat is designed to improve effectiveness of printing inks thereon. U.S. Pat. No. 4,945,008 to Hayes et al. discloses a method of laminating a polymer material to aluminum alloy can stock material as well as products produced by the process thereof. In this process, the aluminum alloy sheet is heated and the laminate is applied thereto using lamination rolls. The laminated sheet material may then be further heated, quenched and dried with a blast of air.

None of the above-mentioned prior art documents teaches or suggests how to produce a polymer laminated drag cast aluminum alloy sheet material suitable for use in drawing operations. Furthermore, none of the prior art cited above teaches or suggests a drag cast aluminum alloy product that is suitable for use as beverage container stock material because of the provision of a polymer material on at least one surface thereof to overcome metallurgical deficiencies in the product of the drag cast aluminum alloy sheet material relating to drawing operations.

SUMMARY OF THE INVENTION

It is accordingly an object of the present invention to provide a method of making a polymer laminated drag cast aluminum alloy container sheet material for use in deep drawing processes and to provide novel products produced by such method.

It is a further object of the present invention to provide a method which permits the use of aluminum alloy stock material produced by drag casting techniques to be used in aluminum beverage container manufacturing processes.

It is a still further object of the present invention to provide a method of making a polymer laminated drag cast aluminum alloy stock material which includes drag casting an aluminum alloy material, rolling it to final gauge and applying a thin polymeric material on the surfaces thereof to overcome deficiencies in the metallurgical properties and the surface and shape characteristics of the drag cast product.

In a variation of the inventive method, the polymeric material is laminated to one or both sides of the drag cast aluminum alloy stock material prior to cold rolling. The laminated material is then cold rolled to final gauge. This variation has the potential benefit of minimizing or eliminating the need to treat the aluminum alloy stock material prior to the application of the polymeric stock material.

In satisfaction of the foregoing objects and advantages, there is provided a method for making a polymer laminated drag cast aluminum alloy container sheet material which includes the steps of direct casting a molten aluminum alloy in the form of a continuous sheet, cold rolling the sheet, cleaning and pretreating the sheet surface to promote adhesion thereto and laminating a polymer material to the sheet surface thereof to permit the drag cast aluminum alloy sheet material to be used in subsequent deep drawing operations.

Also provided by the present invention as an article of manufacture is a composite material comprising a drag cast aluminum alloy sheet having a polymer material such as polyethylene or polyester coated thereon to facilitate drawing of the drag cast aluminum alloy product.

BRIEF DESCRIPTION OF THE DRAWINGS

Reference is now made to the drawings accompanying the application wherein.

DESCRIPTION OF THE PREFERRED EMBODIMENTS

The present invention is concerned with methods for making a polymer laminated drag cast aluminum alloy material, such as container stock material. According to the present invention, it has been discovered that coating a polymer on the surface of a drag cast aluminum alloy permits the coated drag cast aluminum alloy product to be used in various applications, such as in aluminum beverage container manufacturing processes such as deep drawing. The polymer coating provides protective and lubricating qualities to the drag cast aluminum alloy product which overcome the deficiencies in the drag cast product concerning metallurgical structure, surface quality, gauge and profile variation and formability, these deficiencies preventing the use of drag cast aluminum alloy material for deep drawing processes such as aluminum beverage can manufacture.

Figure 1:
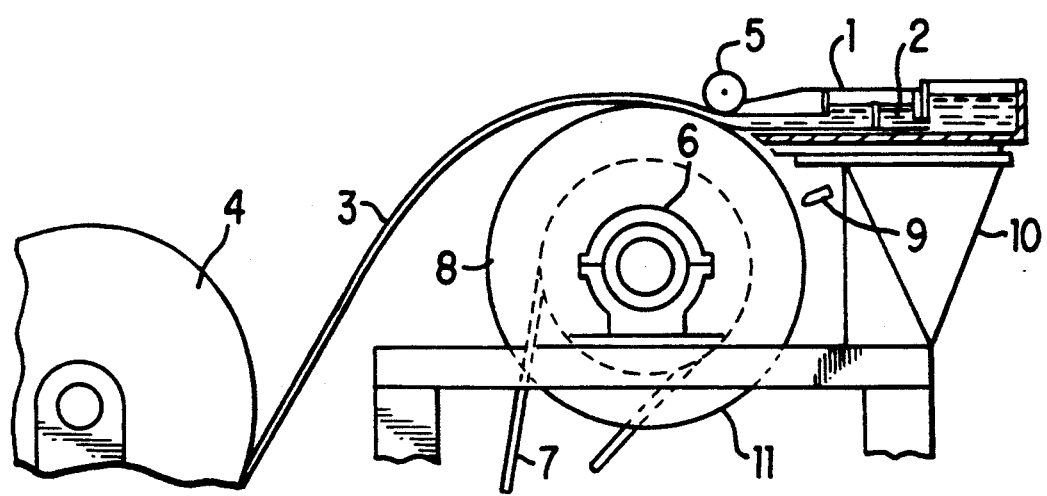
FIG. 1 is a schematic diagram of an aluminum alloy direct casting apparatus.

The first step of the inventive process includes the direct casting of aluminum alloys as shown, for example in U.S. Pat. No. 4,828,012 and other prior art mentioned above. In general, this process and apparatus therefor is shown in FIG. 1. In this direct casting method, a tundish 1 containing molten aluminum alloy 2 is located close to a cylindrical casting drum 8. The drum 8 has a chill surface 11 which may be internally cooled with circulating water or other cooling medium to rapidly extract heat from the chill surface. The chill surface 11 is generally grooved and suitable means such as journal bearings 6 support the casting wheel for rotation about a fixed horizontal axis on a rigid supporting frame 10. Suitable drive means such as a variable speed motor and reduction gear mechanism and a drive chain or belt 7 are also provided in a conventional manner. The apparatus also includes means such as a brush or scraper 9 to clean the chill surface 11 prior to contact with the molten aluminum 2.

In operation, molten aluminum 2 from the tundish 1 contacts the chill surface 11 of the cylindrical casting wheel 8 and forms a solidified aluminum alloy strip 3. The solidified strip is then coiled in a conventional manner on a coiler 4. As a result of this operation, the molten aluminum is converted into a metal strip and coiled while still hot.

The aluminum alloy coil in the "as cast" form will generally have a product or sheet thickness falling in the range of 0.030" to 0.060" thickness.

After cooling of the aluminum coil, it is then preferred to mechanically work the aluminum strip by cold rolling down to normal can stock gauge, for example 0.012 inches. In cold rolling, generally a reduction of about 45 to 85% reduction in thickness may be performed before reannealing is necessary. Given a cast sheet thickness of 0.036" and a final gauge thickness of 0.012", a 73% reduction in thickness would be necessary by cold rolling to achieve the targeted final gauge. Of course, this thickness is exemplary and other gauges may be utilized depending on the subsequent drawing operations.

Optionally, it may also be desirable to further process the cold rolled material by annealing, such as heating for an additional period of time to achieve the annealing effect and final grain structure to meet commercial specifications. Alternatively, the material may be cold rolled to an intermediate gauge, annealed and cold rolled to a final gauge. In this embodiment, an additional annealing step as described above may be utilized to achieve the desired commercial specifications for the cold rolled final gauge product.

The aluminum used in the present invention can take many forms. The aluminum in one embodiment is preferably an aluminum alloy typically used as a stock material for aluminum beverage container material. These alloys include 3000 series and 5000 series aluminum alloys. Preferred aluminum alloys for application with the inventive process include AA 3004 and AA 3104 aluminum alloys from the 3000 series and AA 5017, AA 5042, AA 5052, and AA 5182 from the 5000 series of aluminum alloys.

After the aluminum alloy has been cold rolled and annealed, it is necessary to prepare the surface of the rolled aluminum alloy sheet. The sheet surface may be cleaned and pretreated in preparation for applying the polymer material thereto. These cleaning and pretreating methods promote adhesion of the polymer materials to the aluminum alloy surface. Surface treatment methods that may be used on the aluminum alloy stock material include conventional anodizing processes, chromating processes or phosphating processes such as those utilizing zinc phosphate. It should be understood that these surface treatment methods are well known in the art, and, as such, one skilled in the art would be able to determine the process parameters required for preparing the surfaces of aluminum alloy drag cast products prior to application of polymer coatings.

Once the aluminum alloy drag cast product has been cleaned and pretreated, a polymer material may be laminated thereon. The lamination of polymer materials to aluminum alloy sheet is well known and documented. In this aspect of the invention, and as disclosed in U.S. Pat. No. 4,945,008 cited above, the aluminum alloy sheet to be laminated is heated to a temperature sufficient to promote adhesion of the polymer material thereto but below a temperature that would degrade the polymer material. This heating step may be done by any conventional technique used in prior art processes such as heated rolls or induction heaters. The heating temperature may range between 180° C. to 300° C. depending on the polymer material and aluminum alloy. After the heating step, the polymer material as a thin film may be laminated to the aluminum alloy sheet using lamination rolls. Optionally, it may also be desired to further heat the polymer laminated drag cast aluminum sheet to promote further adhesion of the polymer to the alloy sheet. For example, the sheet may be heated to about 240° C. prior to the laminating step and, after the laminating step, the laminated product may be heated to about 250° C. to 260° C. After heating, the coated sheet may be quenched and dried according to conventional methods such as cold water immersion, wiping and hot air drying. It should be understood that, depending on the application of the aluminum alloy container stock material, one or both surfaces of the drag cast aluminum alloy sheet may be laminated with a polymer material.

Regarding the polymer material, any known polymer material or combination of polymer materials compatible with the drag cast aluminum alloy sheet material may be utilized as the laminating material. Examples of preferred materials include polyethylenes, polyesters, polyolefins or polyamides. Alternatively, polymer materials may be combined to produce multilayered laminates that exhibit multiple properties such as improved adhesion to the aluminum alloy sheet surface as well as improved effectiveness of printing inks thereon. These multilayered polymer materials may be applied to the drag cast aluminum alloy sheet simultaneously in a single laminating step or sequentially in multiple steps.

The thickness of the polymer thin film material, alone or in combination, can range between 5 to 25 microns thick and will vary depending on the thickness of the drag cast aluminum alloy sheet material being coated and the intended subsequent drawing application. A preferred range of the polymer material would be 9–12 microns in thickness. If the polymer material is applied prior to cold rolling, then it should be thicker, for instance, approximately 3 to 10% of the total thickness on each side so as to allow for its reduction in thickness during subsequent cold rolling.

Figure 2:
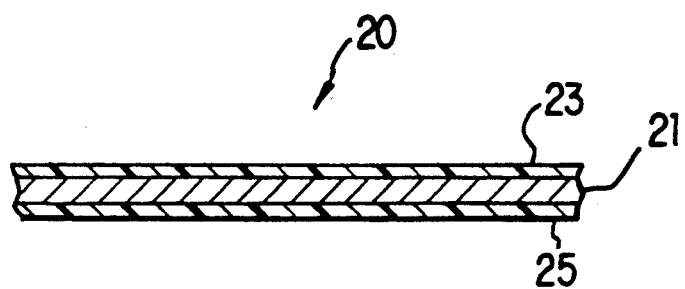
FIG. 2 shows a cross-sectional view of a first embodiment of a polymer laminated drag cast aluminum alloy sheet when drawn into a container.

With reference to FIG. 2 firstly, a first embodiment of the polymer laminated drag cast aluminum alloy sheet material is generally designated by the reference number 20 and is seen to include an aluminum alloy sheet 21 having a first polymer material 23 laminated on a top surface thereof and a second polymer material 25 laminated on a bottom surface thereof. As stated above, the polymer laminates may be a polyester material and the aluminum alloy may be a cast AA 3104 type.

Figure 3:
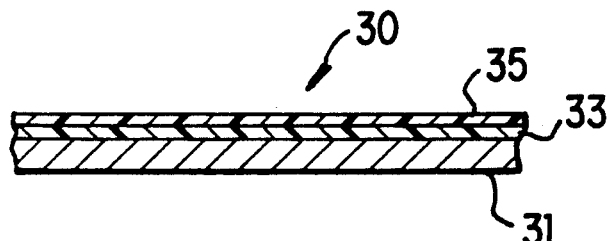
FIG. 3 shows a cross-sectional view of a second embodiment of a polymer laminated drag cast aluminum alloy sheet.

In a second embodiment, and as seen in FIG. 3, a polymer laminated drag cast aluminum alloy sheet product is generally designated by the reference numeral 30 and is seen to include an aluminum alloy sheet 31 having a first polymer 33 laminated to the surface thereof. A second polymer 35 is laminated adjacent to the polymer 33. In this embodiment, the first polymer 33 may be selected based upon improved adhesive properties to the aluminum alloy sheet surface and the second polymer may be selected based upon properties providing improved hosting of inks. For example, the second polymer may be a polyester for use in conjunction with conventional polyester type inks with the first polymer being a polyethylene. In this embodiment, the sum of the thicknesses of the first and second polymer may range up to 25 microns in thickness. The first and second polymer may range in thickness up to 15 microns each. Additionally, a polymer coating (not shown) may be laminated to the lower surface of sheet 31. Preferably, the thickness of the laminated coating is less than about 20 microns, with coatings coating is less than about 20 microns, with coatings not more than 12 microns thick being even more preferred. Thinner coatings should be less expensive than thicker coatings.

Figure 4:
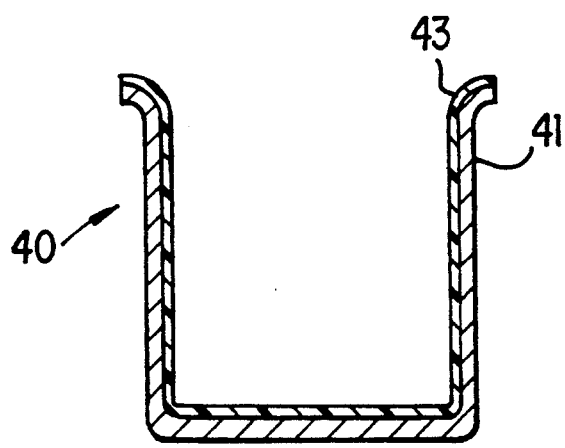
FIG. 4 show a cross-sectional view of a third embodiment of a polymer laminated drag cast aluminum alloy sheet when drawn into a container.

Once the drag cast aluminum alloy sheet has been coated, the polymer laminated can stock may be used in subsequent conventional drawing operations such as to form drawn and ironed can bodies, beverage can ends, deep drawn and re-drawn can bodies and other can closures or components. FIG. 4 depicts a cross-sectional view of a third embodiment of a polymer laminated drag cast aluminum alloy sheet when drawn into a container. The drawn container is generally designated by the reference numeral 40 and includes a drag cast aluminum alloy sheet 41 and a polymer 43 laminated on one surface of the sheet 41. In this embodiment, the polymer laminated drag cast stock material was drawn such that the polymer coated the inner surface of the container. It should be understood that the drawn container may include the polymer material on the inner and outer surface thereof.

In a conventional exemplary drawing method, a circular metal blank may be formed from the drag cast laminated aluminum alloy stock material. The blank then may be formed into a shallow cup by forcing the blank through a drawing die by means of a punch mounted on a press. The cups may then be fed into a body maker apparatus wherein a reciprocating ram with a punch attached to the forward end thereof engages the cup and forces it through a die assembly having one or more dies to form an elongated seamless body. The body maker apparatus may first include a redraw die which reforms the cup into a cup of smaller diameter and longer sidewalls and then include a series of ironing dies having inside diameters which are progressively slightly smaller than the outside of the cup. These ironing dies elongate the sidewall of the redrawn cup to produce a thin-walled body. The thickness of the bottom wall of the container remains unchanged during the drawing and ironing process to provide desired structural characteristics for containers having carbonated beverages therein. After forming, the container bottom wall may be formed to a domed configuration to further increase its pressure resistance capabilities. A typical wall thickness after the can making step would be about 0.005" in the sidewall with a slightly greater thickness in the region of the sidewall which is to be subsequently provided with a flange.

The inventive method produces a novel product that overcomes drawbacks in drag cast aluminum alloy sheet that prevent its use as a beverage container stock material. By laminating a polymer material on the surface of a drag cast aluminum sheet product, a composite material is produced comprising a thin film of a polymer layer on at least one surface of the aluminum alloy drag cast sheet. Given that the drag cast aluminum alloy sheet typically exhibits greater surface porosity and undesirable size and distribution of intermetallic compounds than conventional cast aluminum alloy sheet, the presence of the polymer material overcomes these drawbacks by providing lubricating and protecting properties over the drag cast aluminum alloy sheet surface to enable the drag cast aluminum alloy sheet to be used in subsequent drawing operations. The lubricating properties of the polymer material decrease the adverse effect of decreased formability for drag cast aluminum alloy products during drawing. Furthermore, by maintaining a barrier between the can stock and drawing tools, the drawbacks of drag cast aluminum alloy products lacking proper distribution and size of intermetallic compounds throughout their microstructure is overcome. By this method, a product is formed through drag casting techniques which provides an aluminum beverage container stock material that can be processed similar to stock material produced by conventional ingot casting techniques. The method of coating with a polymer container drag cast stock material to obtain improved drag cast material also should be useful to coat with a polymer roll cast end and tab stock material, for instance material cast with a Hunter caster, to obtain improved roll cast material.

As such, an invention has been disclosed in terms of preferred embodiments thereof which fulfill each and every one of the objects of the invention as set forth hereinabove and provides a new and improved method of making a polymer laminated aluminum alloy beverage container stock material and novel products produced by such method.

Of course, various changes, modifications and alterations in the teachings of the present invention may be contemplated by those skilled in the art without departing from the intended spirit and scope thereof. As such, it is intended that the present invention only be limited by the terms of the appended claims.

What is claimed is:

1. A method of making a polymer laminated drag cast aluminum alloy container sheet material for deep drawing use comprising the steps of:
   a) providing a source of molten aluminum alloy in an open tundish;
   (b) drag casting said molten aluminum alloy in the form of a sheet by pouring said molten aluminum alloy from said open tundish onto a chilled rotating casting roll to solidify said molten aluminum alloy into said sheet;
   c) cold rolling said sheet;
   d) pretreating at least one surface of said sheet to improve adhesion properties of said sheet; and
   e) laminating a polymer material to at least one surface of said sheet to produce a polymer laminated drag cast aluminum alloy beverage container sheet material for deep drawing use.

2. The method of claim 1, wherein the pretreating step c) further comprises pretreating both surfaces of said sheet and the laminating step of step d) further comprises laminating a polymer material to both surfaces of said sheet.

3. The method of claim 1, further comprising, prior to said pretreating step, heat treating said cold rolled sheet to achieve mechanical properties and microstructural properties permitting a further drawing step.

4. The method of claim 1, wherein said pretreating step further comprises subjecting said cold rolled sheet to a pretreating process selected from the group consisting of an anodizing treatment, a phosphatizing treatment and a chromating treatment.

5. The invention of claim 4, wherein said phosphatizing treatment uses zinc phosphate.

6. The method of claim 1, wherein said laminating step further comprises the steps of:
   i) heating said sheet; and
   ii) applying a first thin film of a first polymer material to at least one surface of said sheet.

7. The method of claim 1, wherein said polymer material ranges up to 25 microns in thickness.

8. The method of claim 1, wherein said polymer material is polyethylene or polyester.

9. The method of claim 1, wherein said polymer material is a multilayered composite polymer material.

10. The method of claim 6, further comprising the step of, simultaneously with step ii), applying a second thin film of a second polymer material over said first thin film, said first thin film promoting adhesion to said sheet and said second thin film promoting improved hosting of inks.

11. The method of claim 1, wherein said aluminum alloy container sheet material is selected from the group of AA 3000 series aluminum alloys and AA 5000 series aluminum alloys.

12. The method of claim 11, wherein said aluminum alloy container sheet material is AA 3004 aluminum alloy.

13. The method of claim 11, wherein said aluminum alloy container sheet material is AA 3104 aluminum alloy.

14. The method of claim 1, further comprising the step of forming said polymer laminated drag cast aluminum alloy container sheet material into a beverage container.

15. The method of claim 2, further comprising the step of forming said polymer laminated drag cast aluminum alloy container sheet material into a beverage container.

16. A method of making a polymer laminated drag cast aluminum alloy sheet material product comprising the steps of:
   a) providing a source of molten aluminum alloy in an open tundish;
   b) drag casting said molten aluminum alloy in the form of a sheet by pouring said molten aluminum alloy from said open tundish onto a chilled rotating casting roll to solidify said molten aluminum alloy into said sheet;
   c) laminating a polymer material to at least one surface of said drag cast sheet to produce a polymer laminated drag cast aluminum alloy sheet material; and
   d) cold rolling said laminated sheet material to make the product.

17. The method of claim 16 wherein the polymer material is laminated to two surfaces of the drag cast sheet.

* * * * *